United States Patent Office 3,639,473
Patented Feb. 1, 1972

3,639,473
ACETIC DIPHENYLPHOSPHINIC ANHYDRIDE AND METHOD OF PREPARING SAME
David L. Venezky, Alexandria, Va., assignor to the United States of America as represented by the Secretary of the Navy
No Drawing. Filed Mar. 15, 1968, Ser. No. 713,299
Int. Cl. C07f 9/30
U.S. Cl. 260—545 P               7 Claims

ABSTRACT OF THE DISCLOSURE

Acetic diphenylphosphinic anhydride is prepared by dissolving diphenylphosphinic acid in a large excess of acetic anhydride under heating to form a solution at a temperature of about 50 to 60° C. The mixed anhydride is isolated by flash evaporation of the excess acetic anhydride and the acetic acid from the reaction solution. Higher yields of the mixed anhydride are obtained when a mixture of the diphenylphosphinic acid and a large excess of acetic anhydride are heated to a reflux temperature of about 140° C. in the presence of an added small amount of acetic acid which is sufficient to repress disproportionation of the mixed anhydride at temperatures of about 100° C. and higher up to the reflux temperature.

The invention described herein may be manufactured and used by or for the Government of the United States of America for governmental purposes without the payment of any royalties thereon or therefor.

This invention relates to a new mixed anhydride which contains phosphorus and to a method of preparing the same.

PRIOR ART

Phosphinic anhydrides are generally prepared by methods which involve reaction of the corresponding phosphinic acid chloride with either an ester or sodium salt of a phosphinic acid. Simple dehydration of the corresponding phosphinic acids for the preparation of phosphinic anhydrides has not been reported, nor has the preparation of mixed anhydrides formed between phosphinic acids and carboxylic acids.

It is an object of the present invention to provide a new mixed anhydride which contains phosphorus.

It is also an object to provide a simple method of preparing the new mixed anhydride.

STATEMENT OF INVENTION

I have found that a new mixed anhydride which is acetic diphenylphosphinic anhydride and has the formula:

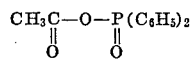

is prepared in good yields and in a simple and direct manner by heating a mixture of diphenylphosphinic acid and a large excess of acetic anhydride to form a solution having a temperature in the range of from about 50 to 60° C. Once this solution is formed, reaction producing the mixed anhydride takes place directly and in accordance with the equation:

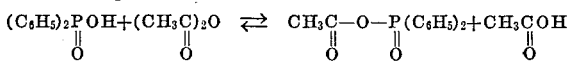

The method of the invention for the preparation of the new mixed anhydride may be carried out by adding the diphenylphosphinic acid to the acetic anhydride used in large excess to provide the diluent for the reaction and, which may be, for example, from 50 to 100 fold of the theoretical for the reaction, and, under stirring, heating the mixture to a temperature of about 50 to 60° C. Solution of the diphenylphosphinic acid in the warmed acetic anhydride occurs in a short period of time, from about 2 to 10 minutes, depending on the heating temperature. At a 60° C. heating temperature, solution occurs within about 2–3 minutes. The formed mixed anhydride is soluble in the reaction solution and is isolated by flash evaporation of the excess acetic anhydride and the acetic acid from the reaction solution. This may be accomplished by cooling the reaction solution, for example, to room temperature, and evaporating the acetic anhydride and acetic acid therefrom under a reduced pressure, for example, 1–5 torr.

The new mixed anhydride is a phosphorylating agent for introducing phosphorus into compounds. As described in my copending application, Ser. No. 658,985, filed Aug. 4, 1967, now abandoned the new mixed anhydride is an intermediate in the preparation of salt-like or thermoplastic polymeric metal phosphinates which, respectively, are useful as pigments in water-base latex or acrylic resin paints and as pressure-molded shapes and articles. In the preparation of the polymeric metal phosphinates, the mixed anhydride is reacted with a hydrous metal nitrate under reflux and the product polymeric metal phosphinate recovered from the reaction mixture by filtration or by flash evaporation of the acetic anhydride therefrom.

The new mixed anhydride disproportionates on heating to 100° C. to yield acetic anhydride and diphenylphosphinic anhydride,

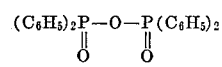

which is a known phosphorylating agent.

In a modification of the method of the invention in which higher yields of the mixed anhydride are obtained, diphenylphosphinic acid and a large excess of acetic anhydride to which a small amount of acetic acid has been added are heated to reflux at a temperature of about 140° C. The amount of the added acetic acid should be sufficient to repress disproportionation of the mixed anhydride at temperatures of 100° C. and higher up to the reflux temperature. Suitably this amount is such that the proportion of the acetic acid to acetic anhydride is initially about 15 mole percent to 85 mole percent, respectively. Reaction forming the mixed anhydride is completed within the period of time required to reach the reflux temperature, although the reflux heating may be continued for longer periods of time.

The method of the invention and the preparation of the acetic diphenylphosphinic anhydride are illustrated by the following specific examples.

EXAMPLE 1

Diphenylphosphinic acid (0.5 gram; 2.3 millimoles) was dissolved in acetic anhydride (25 ml.) by warming these materials to 60° C. under stirring. Solution was obtained in a heating period of about 2–3 minutes. The reaction solution was cooled to room temperature and the excess acetic anhydride and the acetic acid flash evaporated therefrom at low pressures to isolate the formed mixed anhydride which is a white, crystalline product. The product mixed anhydride was twice dissolved in small portions of benzene, with removal of the benzene by flash evaporation, and finally dried on a freeze drier under pressures of less than 1 micron. The dried mixed anhydride, 0.41 gram (70% yield based on the diphenylphosphinic acid) melted between 93 and 97.3° C. in a sealed capillary tube.

EXAMPLE 2

Diphenylphosphinic acid (0.5 gram; 2.3 millimoles) and 25 ml. of acetic anhydride containing approximately 15 mole percent of acetic acid (determined by proton NMR) so as to provide a proportion of acetic acid to acetic anhydride of about 15 moles percent to 85 mole percent, respectively, was heated to reflux temperature (about 140° C.) and refluxed for about 2 hours. The reaction solution was cooled to room temperature and the excess acetic anhydride and the acetic acid flash evaporated therefrom at low pressures to isolate the formed mixed anhydride. Yield, 0.53 gram of acetic diphenylphosphinic anhydride; approximately 90% based on the diphenylphosphinic acid.

Acetic diphenylphosphinic anhydride is a hygroscopic, white crystalline solid which in purified form melts between 99 and 100° C.

In contrast to the capacity of diphenylphosphinic acid to react with acetic anhydride for the formation of acetic diphenylphosphinic anhydride, this mixed anhydride was not found to have been formed on subjecting diphenylphosphinic acid (0.5 gram; 2.3 millimoles) to reflux with glacial acetic acid (25 ml.), on the one hand, and with dry benzene (25 ml.), on the other. Also, diphenylphosphinic acid was not found to dissolve in or react with acetic anhydride at room temperature.

Since the invention described herein may be variously practiced without departing from the spirit or scope thereof, it is intended that specific embodiments appearing in the above description shall be taken by way of illustration and not in limitation except as may be defined in the appended claims.

What is claimed and desired to be secured by letters patent of the United States is:

1. Acetic diphenylphosphinic anhydride.
2. A method of preparing acetic diphenylphosphinic anhydride which comprises dissolving diphenylphosphinic acid in a large excess of acetic anhydride under heating to form a solution at a temperature in the range of from about 50 to 60° C.
3. A method as defined in claim 2 and evaporating excess acetic anhydride and acetic acid from the solution.
4. A method as defined in claim 2, wherein said acetic anhydride is present in amounts 50 to 100 fold that of the diphenylphosphinic acid.
5. A method of preparing acetic diphenylphosphinic anhydride which comprises subjecting diphenylphosphinic acid and a large excess of acetic anhydride to which has been added a small amount of acetic acid to heating under reflux at a temperature of about 140° C., said small amount of added acetic acid being sufficient to repress disproportionation of the mixed anhydride at temperatures of 100° C. and higher up to the reflux temperature.
6. A method as defined in claim 5, wherein the acetic acid is added in an amount to provide an initial proportion of acetic acid to acetic anhydride of 15 mole percent to 85 mole percent, respectively.
7. A method as defined in claim 5, wherein excess acetic anhydride and acetic acid are evaporated from solution.

References Cited

Satchell: Quarterly Reviews XVII, 161, 1963.
Bentley: J. Am. Chem. Soc., 70, 2183, 1948.
Brooks: J. Am. Chem. Soc., 34, 492, 1917
Vedenski: Beilstein II, p. 171, 1922.
Venezky et al.: J. Org. Chem., 32, 838, 1967.

LEWIS GOTTS, Primary Examiner

R. GERSTL, Assistant Examiner

U.S. Cl. X.R.
260—2 P